United States Patent [19]

Sauer

[11] Patent Number: 5,044,675
[45] Date of Patent: * Sep. 3, 1991

[54] HOSE COUPLING

[75] Inventor: Heinz Sauer, Ronneburg, Fed. Rep. of Germany

[73] Assignee: Rasmussen GmbH, Maintal, Fed. Rep. of Germany

[*] Notice: The portion of the term of this patent subsequent to Nov. 13, 2007 has been disclaimed.

[21] Appl. No.: 345,636

[22] Filed: May 1, 1989

[30] Foreign Application Priority Data

May 4, 1988 [DE] Fed. Rep. of Germany ....... 3815169

[51] Int. Cl.$^5$ .............................................. F16L 33/20
[52] U.S. Cl. .................................... 285/256; 285/319; 285/921
[58] Field of Search ............... 285/256, 259, 253, 174, 285/319, 320, 921, 242, 239; 138/109

[56] References Cited

U.S. PATENT DOCUMENTS

| 1,253,309 | 1/1918 | Ulleland | 285/320 X |
| 3,603,621 | 9/1971 | Parsons | 285/94 X |
| 3,711,125 | 1/1973 | Dehar | 285/319 X |
| 4,496,034 | 12/1984 | Sauer | 285/319 X |
| 4,730,856 | 3/1988 | Washizu | 285/921 X |
| 4,753,459 | 6/1980 | Potier | 285/253 |
| 4,775,173 | 10/1986 | Sauer | 285/320 X |

FOREIGN PATENT DOCUMENTS

| 212881 | 4/1957 | Australia | 285/253 |
| 119043 | 1/1959 | U.S.S.R. | 285/256 |

Primary Examiner—Dave W. Arola
Attorney, Agent, or Firm—Peter K. Kontler

[57] ABSTRACT

A coupling which establishes a separable fluid tight connection between a nipple at one end of a pipe and one end portion of a flexible elastic hose has a sleeve with a tubular section insertable into the end portion of a hose and a set of elastic prongs which can engage a retainer at the exterior of the nipple when the latter is inserted into the sleeve. A tubular clamping member surrounds the end portion of the hose and biases it into sealing engagement with the tubular section of the sleeve. A sealing ring in an internal groove of the tubular section is in sealing engagement with the external surface of the nipple. The groove is formed by providing the tubular section with a radially outwardly extending corrugation which contributes to retention of the end portion of the hose between the tubular section and the clamping member.

12 Claims, 2 Drawing Sheets

HOSE COUPLING

CROSS-REFERENCE TO RELATED CASES

The hose coupling of the present invention is similar to those which are disclosed in six commonly owned copending patent applications Ser. Nos. 345,635, 345,652, 345,632, 345,633, 345,680, and 345,679, of Heinz Sauer, all filed May 1, 1989.

BACKGROUND OF THE INVENTION

The invention relates to couplings in general, and more particularly to improvements in couplings for separably and fluidtightly connecting an end portion of a first tubular component (such as a nipple at one end of a metallic or plastic pipe) with an end portion of a second tubular component (e.g., a flexible elastic hose). Still more particularly, the invention relates to improvements in couplings of the type wherein a sleeve-like tubular coupling member is at least partially insertable into the end portion of the second component and has one or more prong-like elastically deformable coupling elements engageable with an external retainer of the end portion of the first component, wherein at least one annular sealing element is interposed between the exterior of the end portion of the first component and the sleeve, and wherein an annular clamping member serves to maintain the end portion of the second component in sealing engagement with the exterior of the sleeve.

Commonly owned U.S. Pat. No. 4,775,173 to Sauer discloses a hose coupling wherein the sleeve is provided with an external groove for reception of a sealing element which is confined in the end portion of one of the two tubular components in assembled condition of the coupling. The sleeve extends into the end portions of both tubular components and is provided with elastically deformable external prongs which can engage an external retainer on one of the end portions. The sleeve is made of a plastic material.

A drawback of the patented coupling is that the sleeve is rather expensive because it must be produced in a complex plastic processing machine. Moreover, the radially outwardly extending prong-like coupling elements of the sleeve are likely to be accidentally disengaged from the retainer or damaged in storage, during shipment or in actual use of the coupling. Still further, a substantial force must be exerted for introduction of the sleeve into the end portion of the one and/or the other tubular component.

OBJECTS OF THE INVENTION

An object of the invention is to provide a simple, compact and inexpensive coupling for the establishment of a separable fluidtight connection between two tubular components, particularly a coupling which can separably connect a nipple at one end of a metallic or plastic pipe with an end portion of a flexible elastic hose.

Another object of the invention is to provide a novel and improved sleeve-like tubular coupling member for use in the above outlined coupling.

A further object of the invention is to provide the coupling with novel and improved means for reliably and sealingly clamping an end portion of a hose or another flexible elastic tubular component.

An additional object of the invention is to provide a novel and improved method of facilitating insertion of a sleeve-like tubular coupling member into an end portion of a tubular component which is to be separably and fluidtightly secured to the end portion of another tubular component.

Still another object of the invention is to provide a novel and improved method of facilitating assembly of a sleeve-like tubular coupling member with an end portion of a hose.

An additional object of the invention is to provide a method of deforming a tubular coupling member so that the deformed coupling member can perform a plurality of different functions, such as sealingly engaging a deformable first tubular component and facilitating sealing engagement with a second tubular component.

SUMMARY OF THE INVENTION

One feature of the present invention resides in the provision of a coupling which can be used to establish a separable fluidtight connection between an end portion of a first tubular component and an end portion of a second tubular component, particularly between a nipple of a pipe and an end portion of a flexible elastic hose. The improved coupling comprises a sleeve-like tubular coupling member having a tubular first section which is insertable into the end portion of the second component and a second section including at least one prong-shaped flexible coupling element which is engageable with an external retainer of the end portion of the first component. The first section of the tubular coupling member has an internal surface and at least one annular corrugation defining a groove which extends from the internal surface radially outwardly of the first section, and the coupling further comprises an annular sealing element which is received in the groove and is engageable with the exterior of the end portion of the first component. Still further, the coupling comprises a clamping member having means for biasing the end portion of the second component into sealing engagement with the exterior of the first section of the tubular coupling member. The at least one coupling element can be substantially parallel with the axis of the tubular coupling member.

The clamping member can include a circumferentially complete tubular portion which serves to closely surround the end portion of the second component.

The biasing means of the clamping member can comprise two radially inwardly extending corrugations which flank the corrugation of the tubular section, and the corrugation of the tubular section then serves to urge the material of the end portion of the second component into the clamping member between the radially inwardly extending corrugations when the end portion of the second component is received between the tubular section and the clamping member. The clamping member can be made of a ductile metallic or plastic material, and its radially inwardly extending corrugations can but need not develop as a result of deformation of the clamping member around the end portion of the second component, preferably as a result of radially inward deformation of corresponding portions of the clamping member.

The sections of the tubular coupling member can constitute two separately produced parts, and the tubular coupling member then preferably comprises means for form-lockingly connecting the first and second sections to each other. The connecting means can include a corrugation of the first section and a complementary second corrugation which is provided on the second section. One of these corrugations extends into the other corrugation.

The clamping member can be connected with one of the sections. The construction of the coupling is preferably such that the clamping member is integral with the first section of the tubular coupling member.

Another feature of the invention resides in the provision of a method of assembling a coupling which establishes a separable fluidtight connection between an and portion of a first tubular component and an end portion of a second tubular component, particularly between the nipple of a metallic or plastic pipe and an end portion of a flexible elastic hose, by means of a tubular coupling member having a tubular first section and a second section including at least one flexible coupling element which is engageable with an external retainer of the end portion of the first component. The method comprises the steps of applying a friction reducing agent to the interior of the end portion of the second component and/or to the exterior of the first section of the tubular coupling member, and thereupon inserting the first section into the end portion of the second component.

The method further comprises the steps of applying a tubular clamping member around the end portion of the second component prior to the inserting step. Such method can further comprise the step of providing the clamping member with at least one corrugation which urges the end portion of the second component into sealing engagement with the first section of the tubular coupling member. Still further, the method can comprise the step of providing the first section of the tubular coupling member with at least one corrugation which urges the end portion of the second component into engagement with the clamping member.

The method can also comprise the steps of separately producing the first and second sections of the tubular coupling member and form-lockingly connecting the first and second sections to each other.

The method can also comprise the step of making the clamping member an integral part of one section of the tubular coupling member.

Still further, the method can comprise the steps of providing one section of the tubular coupling member with a corrugation to define an internal groove, inserting an annular sealing element into the groove, and thereupon introducing the end portion of the first component into the one section so that the introduced end portion of the first component deforms the sealing element and maintains it in sealing engagement with the one section as well as with the first component.

The novel features which are considered as characteristic of the invention are set forth in particular in the appended claims. The improved coupling itself, however, both as to its construction and the mode of assembling the same, together with additional features and advantages thereof, will be best understood upon perusal of the following detailed description of certain specific embodiments with reference to the accompanying drawing.

DESCRIPTION OF PREFERRED EMBODIMENTS

Figure 1:
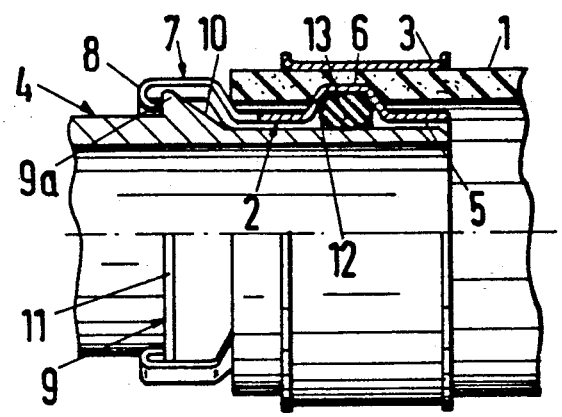
FIG. 1 is a partly elevational and partly axial sectional view of a coupling which embodies one form of the invention.

The coupling which is shown in FIG. 1 serves to separably and fluidtightly connect an end portion 4 of a metallic pipe with an end portion of a flexible elastic hose 1. The end portion 4 is a nipple which extends into the end portion of the hose 1 when the coupling is fully assembled. This coupling comprises a sleeve-like tubular coupling member 2 (hereinafter called sleeve), a tubular clamping member 3, and an annular sealing element 13, e.g., an 0-ring. The end portion of the hose 1 is sealingly clamped between the sleeve 2 and the clamping member 3, and the sealing element 13 is in sealing engagement with the external surface of the nipple 4 as well as with the surface bounding a circumferentially complete groove 12 in the internal surface of the sleeve 2. The clamping member 3 is a relatively short cylinder which is made of a non-deformable material (e.g., a rigid metallic material which need not exhibit any appreciable ductility or resiliency).

The sleeve 2 comprises a circumferentially complete tubular section 5 which is provided with a radially outwardly extending corrugation 6. The latter defines the groove 12 for the sealing element 13. At least that portion of the corrugation 6 which is nearer to the right-hand axial end of the tubular section 5 resembles or constitutes the frustum of a hollow cone which slopes radially inwardly toward the right-hand axial end. This facilitates insertion of the tubular section 5 into the end portion of the hose 1. The inner diameter of the tubular section 5 only slightly exceeds the outer diameter of the nipple 4.

The sleeve 2 further comprises a second section which is integral with the left-hand axial end of the tubular section 5 and is composed of one or more (e.g., three) elongated prong-shaped flexible elastic coupling elements 7. Each such coupling element (hereinafter called prong) is substantially parallel with the axis of the tubular section 5, and these prongs are preferably equidistant from each other in the circumferential direction of the sleeve 2.

Each prong 7 comprises an inwardly bent hook-shaped free end portion 8 which is remote from the tubular section 5 and serves to engage a radially extending ring-shaped flank 11 of a retainer 9 in the form of a circumferentially complete rib at the exterior of the nipple 4. If desired, the retainer 9 can include the rib and a discrete radially outwardly extending tooth-shaped projection 9a for each hook-shaped end portion 8. The retainer 9 has a frustoconical second flank 10 which slopes radially inwardly in a direction away from the flank 11, namely toward the free end of the nipple 4. The end portions 8 slide along the flank 11 during insertion of the nipple 4 into the sleeve 2, and such insertion can be completed when the end portions 8 are free to move radially inwardly due to innate elasticity of the prongs 7 so that the end portions 8 engage or move adjacent the radially extending flank 11 whereby the retainer 9 prevents accidental extraction of the nipple 4 from the assembly including the sleeve 2, the end portion of the hose 1, the clamping member 3 and the sealing element 13.

The dimensions of the sealing element 13 are selected in such a way that the sealing element is deformed in response to insertion of the nipple 4 into the sleeve 2 so that the sealing element then bears against the surface bounding the groove 12 as well as against the external surface of the nipple 4 to thus establish a fluidtight connection between the nipple and the sleeve.

The end portion of the hose 1 is sealingly secured to the sleeve 2 prior to insertion of the nipple 4 into the sleeve. Such securing operation involves slipping the clamping member 3 onto the end portion of the hose 1 until the clamping member reaches an annular anvil or stop 14 (FIG. 2) which is used to ensure that the clamping member is arrested at an optimum distance from the free end of the hose 1. The next step includes the application of a friction reducing agent to the external surface of the tubular section 5 of the sleeve 2 and/or to the internal surface of the end portion of the hose 1 in order to facilitate insertion of the tubular section into the hose (see FIG. 2). The friction reducing agent can be applied by a brush or in the form of a spray. Insertion of the tubular section 5 into the end portion of the hose 1 can be carried out in a suitable machine which applies the anvil 14 around the hose prior to insertion of the tubular section 5. The direction of insertion of the tubular section 5 into the end portion of the hose 1 is indicated by an arrow which is shown in the left-hand portion of FIG. 2. When the inserting step is completed, the properly applied clamping member 3 abuts the anvil 14 which is held in the assembling machine. The outer diameter of the corrugation 6 is greater than the inner diameter of the end portion of the hose 1 (in undeformed condition of the hose) so that, when the friction reducing action of friction reducing agent is terminated, the end portion of the hose 1 is reliably clamped between the member 3 and the corrugation 6. The clamping action suffices to establish a reliable seal between the internal surface of the end portion of the hose 1 and the external surface of the tubular section 5 as well as to prevent extraction of the end portion of the hose 1 from the annular space between the tubular section 5 and the clamping member 3.

The sealing element 13 can be inserted into the groove 12 (i.e., into the corrugation 6) prior or subsequent to insertion of tubular section 5 into the end portion of the hose 1. The last step of assembling the coupling includes insertion of the nipple 4 into the sleeve 2 whereby the free end portions 8 of the prongs 7 slide along the frustoconical ramp-like flank 10 of the retainer 9 and ultimately engage the radially extending flank 11 to thus prevent accidental extraction of the nipple 4 from the sleeve 2. Such extraction is possible only when the prongs 7 are intentionally flexed radially outwardly to move their free end portions 8 radially outwardly of the retainer 9 and of its tooth-like projections 9a (if any). An attempt to extract the nipple 4 from the sleeve 2 while the free end portions 8 of the prongs 7 are still adjacent the left-hand side of the retainer 9 (i.e., adjacent the flank 11) merely entails some flexing of the end portions 8 and eventually a full surface-to-surface abutment of each end portion 8 with the adjacent portion of the flank 11.

An important advantage of the coupling which is shown in FIG. 1 is its simplicity. This is attributable, in part, to versatility of the sleeve 2. Thus, the single corrugation 6 of the tubular section 5 of this sleeve serves the dual purpose of defining the groove 12 for the sealing element 13 as well as of compressing the adjacent part of the end portion of the hose 1 to thereby ensure reliable retention of the end portion of the hose between the section 5 and the clamping member 3.

Another important advantage of the improved coupling is its compactness. Thus, the sleeve 2 is relatively short because its tubular section 5 is provided with a single corrugation 6 and the prongs 7 are integral with the left-hand axial end of the tubular section. A short sleeve is desirable and advantageous because it is cheaper, especially if it is made of a rather expensive springy metallic sheet material.

The utilization of a non-deformable clamping member 3 also contributes to simplicity of the coupling and to a lower cost of assembling its parts because the applied clamping member need not be acted upon by any rolling and/or other deforming instrumentalities which are necessary for the assembly of many couplings wherein the clamping member must be provided with one or more corrugations after it is slipped onto the end portion of a hose or another tubular component. All that is necessary is to select a tubular clamping member having an inner diameter which matches or approximates the outer diameter of the end portion of the hose 1 in undeformed condition of the hose.

If the operator desires to separate the nipple 4 from the hose 1, the prongs 7 must be flexed radially outwardly, e.g., by a suitable tool or in a suitable machine. When the free end portions 8 of the thus flexed prongs 7 are located radially outwardly of the retainer 9 and its flank 11, the nipple 4 can be extracted from the sleeve 2 or the sleeve can be slipped off the nipple with a minimum of effort. The effort merely involves overcoming the frictional engagement between the deformed sealing element 13 and the external surface of the nipple 4. The sleeve 2 can be slipped off and reapplied around the nipple 4 as often as desired.

The tubular section 5 of the sleeve 2 can be provided with two or more corrugations each of which can receive a discrete sealing element or each of which can receive several sealing elements. As a rule, a single corrugation will suffice (if a single sealing element suffices) to provide room for sealing means in the gap between the sleeve and the nipple 4 as well as to ensure reliable retention of the end portion of the hose 1 within the confines of the coupling member 3. In other words, it is not necessary to provide the sleeve 2 with one or more corrugations for the sole purpose of retaining the end portion of the hose 1 between the sleeve and the clamping member 3.

The layer of friction reducing agent which facilitates insertion of the tubular section 5 into the end portion of the hose 1 can be applied to the internal surface of the end portion of the hose and/or to the external surface of the tubular section 5 subsequent to application of the clamping member 3 around the end portion of the hose.

Figure 2:
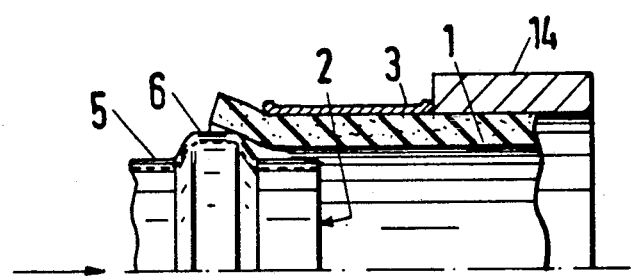
FIG. 2 is a fragmentary axial sectional view of certain parts of the coupling of FIG. 1 during introduction of the first section of the tubular coupling member into the end portion of the second tubular component.
Figure 3:
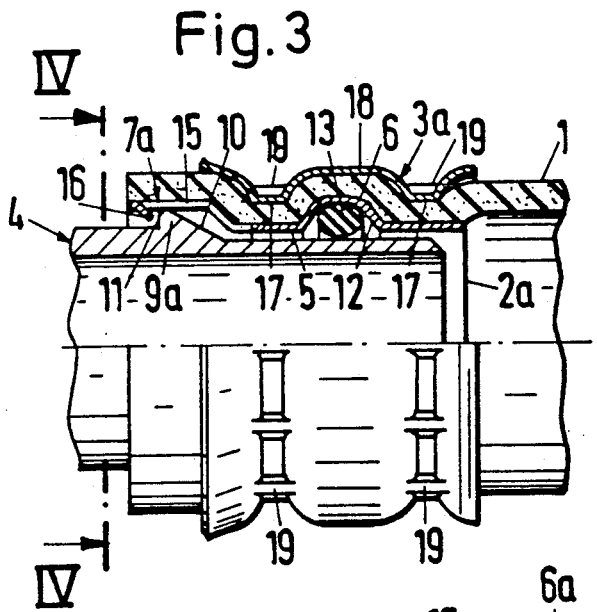
FIG. 3 is a partly elevational and partly axial sectional view of a second coupling.
Figure 4:
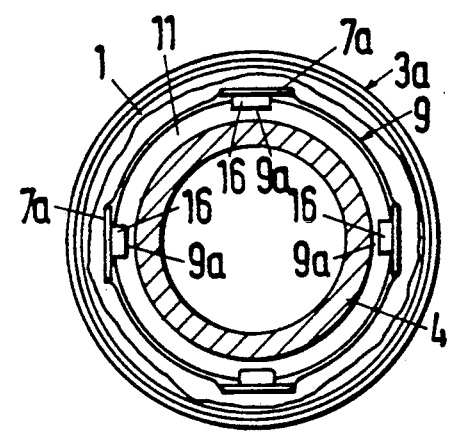
FIG. 4 is a sectional view substantially as seen in the direction of arrows from the line IV—IV of FIG. 3.

FIGS. 3 and 4 show a second coupling which differs from the coupling of FIGS. 1-2 primarily in that it employs: a modified clamping member 3a which is made of a deformable (particularly ductile) metallic material. Moreover, the coupling of FIGS. 3-4 employs a somewhat modified tubular coupling member or sleeve 2a which is completely confined in the end portion of the hose 1 when the coupling is assembled. The inner diameter of the entire sleeve 2a is greater than the outer diameter of the nipple 4 (save for the retainer 9). Also, the second section of the sleeve 2a comprises four flexible elastic coupling elements or prongs 7a which are equidistant from each other in the circumferential direction of the tubular section 5 of the sleeve. Each prong 7a engages the adjacent portion 9a of the retainer 9 on the nipple.

Each prong 7a is formed with an opening 15 which is adjacent its free end and serves to receive one of the portions 9a in assembled condition of the coupling. In addition, each prong 7a includes a radially inwardly bent lug 16 which is adjacent the radial flank 11 of the retainer 9 when the portions 9a are free to enter the respective openings 8. The prongs 7a can be flexed in such a way that their lugs 16 move in radially extending planes including the axis of the sleeve 2a.

The clamping member 3a is an originally cylindrical or substantially cylindrical piece of tubular metallic stock which is deformed subsequent to its application around the end portion of the hose 1 so that it develops two radially inwardly extending circumferentially complete corrugations 17 which flank the corrugation 6 of the tubular section 5, and a radially outwardly extending circumferentially complete corrugation 18 which is in axial alignment with and spacedly surrounds the corrugation 6. The corrugations 6, 17 and 18 cooperate to impart to the end portion of the hose 1 an undulate shape such as is best suited to reduce the likelihood of separation of the hose from the deformed clamping member 3a and/or from the tubular section 5 when the latter is surrounded by the clamping member. The making of radially inwardly extending corrugations 17 results in the development of substantially axially parallel creases 19 which contribute to rigidity of the deformed clamping member 3a, especially to the ability of the clamping member to resist bending or flexing stresses.

The sleeve 2a is preferably assembled with the sealing element 13, clamping member 3a and end portion of the hose 1 before the nipple 4 is inserted into the sleeve. The making of corrugations 17, 18 takes place subsequent to application of the clamping member 3a around the end portion of the hose 1. If necessary, a friction reducing agent can be applied to the internal surface of the undeformed clamping member 3a and/or to the external surface of the end portion of the hose 1 before the clamping member 3a is slipped onto the hose and against an anvil (not shown), such as the anvil 14 of FIG. 2. As already explained in connection with FIGS. 1 and 2, a friction reducing agent is or can be used to facilitate insertion of tubular section 5 of the sleeve 2a into the end portion of the hose 1.

The inner diameter of the end portion of the hose 1 (in undeformed condition of the hose) is somewhat smaller than the diameter of a circle including the radially outermost portions of the prongs 7a (in unstressed condition of the prongs). This ensures that, when the sleeve 2a is inserted into the end portion of the hose 1 in a manner as shown in FIG. 3, i.e., that at least a portion of each prong 7a is surrounded by the end portion of the hose, the end portion of the hose is at least slightly expanded and thereupon biases the free end portions of the prongs 7a radially inwardly. This is desirable when the assembly of the coupling is completed because the lugs 16 are even more reliably held in optimum positions adjacent the radial flank 11 of the retainer 9. Moreover, the hose 1 shields the prongs 7a and further reduces the likelihood of accidental separation of one or more prongs from the retainer 9. The material of the hose 1 yields during insertion of the nipple 4 into the sleeve 2a, i.e., while the lugs 16 of the prongs 7a slide along the frustoconical flank 10 of the retainer 9 on their way toward the flank 11.

The lugs 16 even further enhance the reliability of connection between the prongs 7a and the retainer 9. Thus, if the nipple 4 is subjected to the action of a force which tends to extract it from the sleeve 2a, the inclination of the lugs 16 changes until the lugs move into a plane which extends at right angles to the axis of the nipple so that each lug 16 is then in maximum surface-to-surface contact with the retainer 9.

Figure 5:
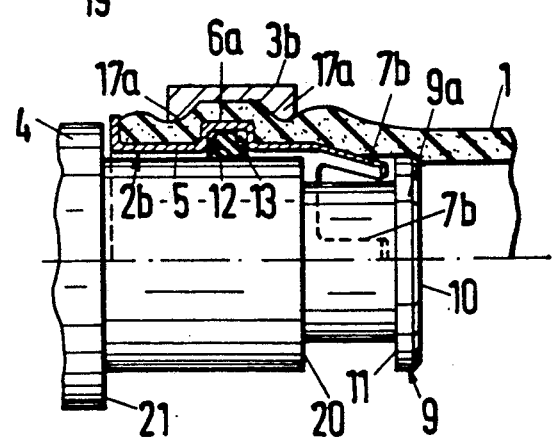
FIG. 5 is a fragmentary axial sectional view of a third coupling.

FIG. 5 shows a portion of a third coupling with a modified tubular coupling member or sleeve 2b, a modified clamping member 3b, and a sealing element 13. This coupling serves to connect one end portion of the hose 1 with a modified nipple 4.

The tubular section 5 of the sleeve 2b is formed with a radially outwardly extending corrugation 6a which has a substantially square or rectangular cross-sectional outline. Again the corrugation 6a defines a groove 12 for the sealing element 13 and cooperates with the clamping member 3b to sealingly engage the internal surface of the end portion of the hose 1 and to hold the end portion of the hose against axial movement relative to the sleeve 2b and clamping member 3b. The clamping member 3b is provided with radially inwardly extending deforming portions in the form of circumferentially complete ribs or beads 17a which flank the corrugation 6a and bias the adjacent portions of the end portion of the hose 1 toward the external surface of the tubular section 5. Such clamping member 3b contributes to the establishment of a reliable sealing engagement between the tubular section 5 and the end portion of the hose 1 as well as to reliable retention of the end portion of the hose in an optimum axial position with reference to the clamping member 3b and sleeve 2b. Insertion of the tubular section 5 into the end portion of the hose 1 and/or the application of the clamping member 3b over the end portion of the hose can be facilitated by resorting to a suitable evaporable friction reducing agent.

Instead of being provided with axially parallel or radially outwardly flexed coupling elements or prongs, the sleeve 2b of FIG. 5 has a second section composed of radially inwardly sloping prongs 7b. Furthermore, the section which includes the prongs 7b is located deeper in the end portion of the hose 1 than the circumferentially complete tubular section 5 of the sleeve 2b. The prongs 7b are equidistant from each other in the circumferential direction of the sleeve 2b, and each of these prongs is elastically flexible in a plane which includes the axis of the sleeve.

The nipple 4 has a circumferentially complete external groove 20 which is adjacent the radially extending flank 11 of the retainer 9. The latter further includes a second flank 10 at the free end of the nipple 4. This retainer can be said to consist of a set of immediately adjacent projections 9a which together form a circumferentially complete rib.

The inner diameter of the tubular section 5 is slightly greater than the major part of the nipple 4, namely that part which includes the retainer 9, the portion surrounded by the groove 20 and a cylindrical portion extending between the groove 20 and a radial shoulder 21.

The sleeve 2b is assembled with the end portion of the hose 1, with the sealing element 13 and with the clamping member 3b prior to insertion of the nipple 4. The assembly of parts 2b, 3b, 1 and 13 can be carried out in substantially the same way as described for the parts 1, 2, 3 and 13 in connection with the coupling of FIGS. 1 and 2. The only difference is that the corrugation 6a is formed subsequent to insertion of the sleeve 2b into the end portion of the hose 1 and the sealing element 13 is thereupon inserted into the thus formed groove 12 in the internal surface of the tubular section 5.

During insertion of the nipple 4 into the sleeve 2b, the retainer 9 slides within the tubular section 5 and beyond the sealing element 13 on its way toward the prongs 7b constituting the second section of the sleeve 2b. Insertion of the nipple 4 is completed when the radially outwardly bent collar-shaped left-hand end portion of the tubular section 5 is engaged by the radial shoulder 21. At such time, the free end portions of the prongs 7b can move radially inwardly to enter the groove 20 in front of the radial flank 11 of the retainer 9. This completes the assembly of the coupling and establishes a reliable connection between the hose 1 and the nipple 4. When the prongs 7b are free to assume their normal positions (either prior to insertion of the nipple 4 into the sleeve 2b or when such insertion is completed), the diameter of the circle which is defined by their free ends is at least slightly smaller than the maximum diameter of the radial flank 11 on the retainer 9; this ensures that the prongs 7b enter the groove 20 and remain therein as soon as the insertion of the nipple 4 into the sleeve 2b is complete, i.e., as soon as the shoulder 21 reaches or comes very close to the radially outwardly extending collar at the left-hand axial end of the tubular section 5. The flank 10 slides along the inner sides of the prongs 7b during the last stage of insertion of the nipple 4 into the sleeve 2b.

The exertion of a force in a direction to extract the nipple 4 from the sleeve 2b results in a flexing of the prongs 7b whereby the free ends of the prongs slide radially inwardly along the flank 11 to ensure the establishment of an even more reliable connection between the nipple 4 and the hose 1.

In order to separate the nipple 4 from the hose 1, it is necessary to first remove the clamping member 3b. To this end, the clamping member can be made of two semicylindrical shells which are articulately connected to each other by a hinge and the free ends of which are affixed to each other by a screw or the like in a manner not forming part of the present invention. Once the clamping member 3b is removed, the end portion of the hose 1 can be slipped off the sleeve 2b to expose the prongs 7b which are thereupon flexed radially outwardly to permit extraction of the nipple 4 from the sleeve. The sleeve 2b can be reused in another coupling, or the coupling of FIG. 5 can be reassembled as often as desired. If the clamping member 3b is a one-piece body, it must be destroyed preparatory to detachment of end portion of the hose 1 from the sleeve 2b.

Figure 6:
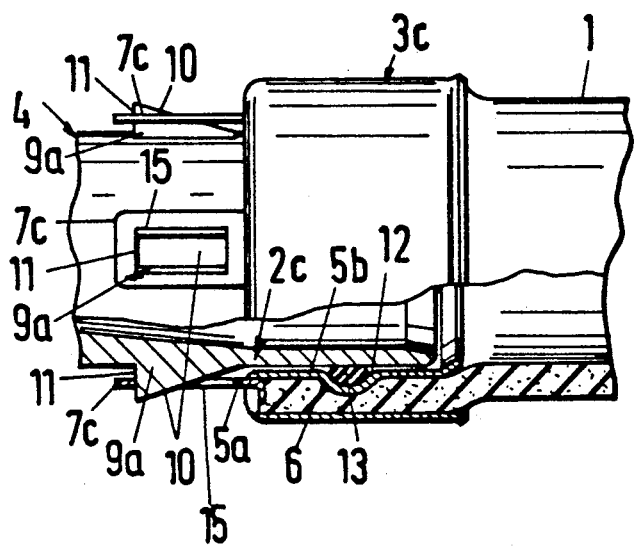
FIG. 6 is a partly elevational and partly axial sectional view of a fourth coupling.
Figure 7:
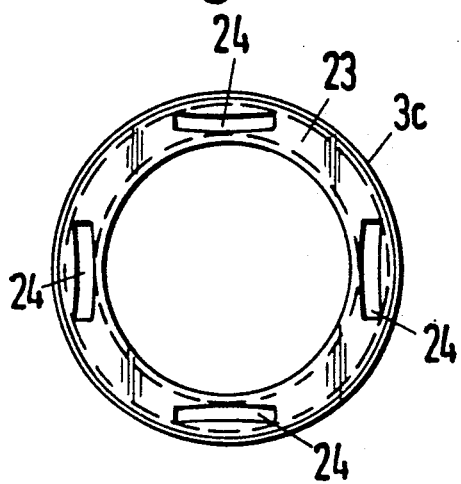
FIG. 7 is an end elevational view of the tubular coupling and clamping members which are used in the coupling of FIG. 6.

FIG. 6 shows a further embodiment of the improved coupling wherein the tubular coupling member or sleeve 2c is assembled of two separately produced tubular sections 5a and 5b. In addition, the clamping member 3c is integral with one axial end of the section 5b. To this end, the one axial end of the section 5b is integral with a radially extending washer-like wall 23 which is also integral with the adjacent axial end of the clamping member 3c. The section 5b and the clamping member 3c together form a twin-walled tubular body which defines an annular space for the end portion of the hose 1. FIG. 7 shows the twin-walled body including the section 5b of the sleeve 2c and the clamping member 3c in an end elevational view as seen from the left-hand side of FIG. 6. The wall 23 is formed with slot-shaped apertures 24 for the coupling elements or prongs 7c of the tubular section 5a.

The section 5b is fully received in the end portion of the hose 1 when the latter is properly inserted into the aforementioned annular space between the section 5b and the clamping member 3c. This section 5b is formed with a radially outwardly extending corrugation 6 which defines the annular groove 12 for the sealing element 13.

Figure 8:
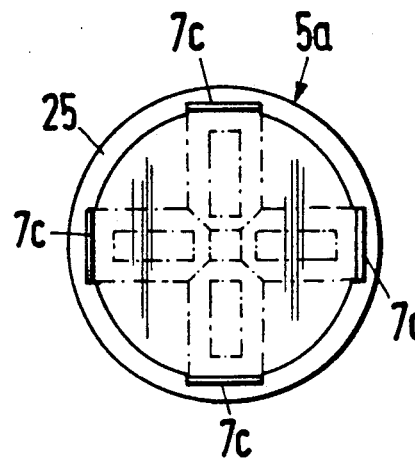
FIG. 8 is an end elevational view of the second section of the tubular coupling member which is used in the coupling of FIG. 6.
Figure 9:
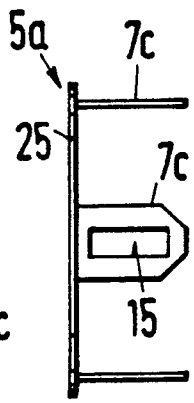
FIG. 9 is an elevational view of the second section which is shown in FIG. 8.

The tubular section 5a is preferably made by stamping from thin sheet metal stock, and its configuration is shown in FIGS. 8 and 9. This section includes a ring-shaped portion 25 and four equally spaced arms or prongs 7c which are initially located in the plane of the ring-shaped portion 25. The starting positions of the prongs 7c are indicated in FIG. 8 by phantom lines. The prongs 7c are thereupon bent into planes extending at right angles to the plane of the ring-shaped portion 25 (see FIG. 9). An advantage of the tubular section 5a is that it can be mass-produced at a low cost because the percentage of material to be removed from the blank which is being converted into a section 5a is minimal. Some material must be removed in order to provide each prong 7c with an elongated slot-shaped opening 15 best shown in FIG. 9.

The twin-walled body including the tubular section 5b and the clamping member 3c can be formed in a press wherein a blank is acted upon by suitable deforming instrumentalities, preferably without any heating, i.e., as a result of cold flow of the material of the blank.

In order to assemble the coupling of FIG. 6, the tubular section 5a is inserted into the twin-walled body of FIG. 7 so that the ring-shaped portion 25 remains in the annular space adjacent the inner side of the wall 23 but the prongs 7c project through and beyond the respective apertures 24. In the next step, the end portion of the hose 1 is inserted into the annular space of the twin-walled body so that its end face abuts the ring-shaped portion 25 and maintains the latter in contact with the wall 23. The next step involves the making of the corrugation 6 in a suitable machine whereby the corrugation ensures that the end portion of the hose 1 is reliably held between the tubular section 5b and the clamping member 3c. If desired, the clamping member 3c can be provided with one or more corrugations (e.g., with corrugations of the type shown on the clamping member 3a of FIG. 3) in order to further enhance the clamping action upon the end portion of the hose 1.

The external surface of the nipple 4 which is shown in FIG. 6 is provided with a composite retainer having a discrete tooth-shaped projection 9a for each prong 7c. Each projection 9a has a radial flank 11 and a sloping flank or ramp 10 along which the free end portion of a prong 7c slides during insertion of the nipple 4 into the sleeve 2c. The inserting operation is completed when each projection 9a enters one of the openings 15. The prongs 7c are made of elastically deformable material so that they can be readily flexed while their free end portions slide along the sloping flanks 10 of the respective projections 9a. Insertion of the nipple 4 into the sleeve 2c is preceded by insertion of the sealing element 13 into the groove 12 within the confines of the corrugation 6.

The wall 23 and the ring-shaped portion 25 with its prongs 7c can be said to establish a form-locking connection between the sleeve 2c and the clamping member 3c when the prongs 7c are received in the apertures 24 of the wall 23 and the end portion of the hose 1 is properly confined between the tubular section 5b and the clamping member 3c.

Figure 10:
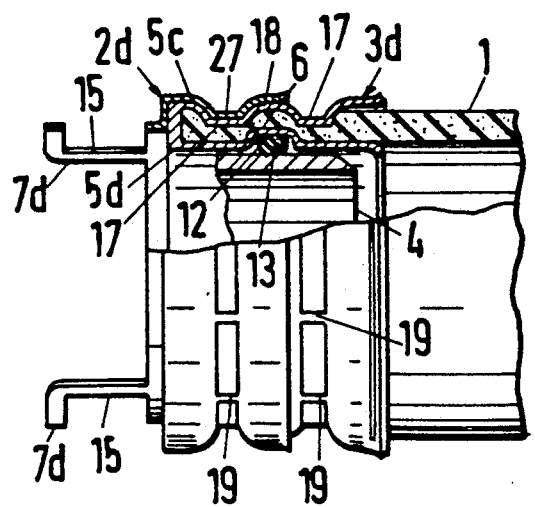
FIG. 10 is a partly elevational and partly axial sectional view of a fifth coupling.

Referring to FIG. 10, there is shown a coupling which constitutes a modification of the coupling of FIGS. 6 to 9. The tubular clamping member 3d is integral with the tubular section 5d of the tubular coupling member or sleeve 2d, and the tubular section 5c of the sleeve 2d is form-lockingly connected to the twin-walled body including the section 5d and the clamping member 3d by a pair of corrugations which are complementary to each other (i.e., one corrugation extends into the other corrugation). The end portion of the hose 1 is clamped in the annular space which is defined by the twin-walled body including the clamping member 3d and the tubular section 5d of the sleeve 2d. The connecting wall between the left-hand axial end of the clamping member 3d and the left-hand axial end of the tubular section 5d does not have any apertures because the tubular section 5c is not received in the space between 3d and 5d. The section 5c includes four equidistant substantially axially parallel elastic prongs 7d each of which has an opening 15 for a discrete projection 9a (not shown) of a retainer (not shown) at the exterior of the nipple (not shown).

The clamping member 3d is a deformed originally cylindrical part which is provided with two circumferentially complete corrugations 17 flanking the corrugation 6 of the tubular section 5d to ensure proper retention of and proper sealing engagement with the end portion of the hose 1. The making of corrugations 17 and 18 takes place simultaneously with the making of a corrugation 27 in the tubular section 5c of the sleeve 2d. This establishes a form-locking connection (17, 27) between the sections 5c, 5d and more specifically between the clamping member 3d (which is integral with the section 5d) and the section 5c.

The nipple which is receivable in the sleeve 2d of FIG. 10 is or can be identical with the nipple 4 of FIG. 6. Each prong 7d is arched in the circumferential direction of the sleeve 2d. The manner in which the end portion of the hose 1 can be received and retained between the clamping member 3d and the tubular section 5d of the hose 2d is or can be the same as described above in connection with FIGS. 6 to 9.

A friction reducing agent is preferably used to facilitate insertion of the end portion of the hose 1 into the annular space between the clamping member 3d and the tubular section 5d. At least the corrugations 17, 18 and 27 are preferably formed subsequent to insertion of end portion of the hose 1 into the aforementioned annular space.

An advantage of the sleeve 2c or 2d is that its section 5b or 5d can be made of a relatively thin and inexpensive material so that only the section 5a or 5c must be made of a higher-quality resilient material. This contributes to lower cost of the entire coupling.

The friction reducing agent can constitute a low-viscosity substance which is composed of a lubricant and a solvent for the lubricant. The parts to be connected with one another are immersed into the agent for a short interval of time, or the agent is sprayed onto such parts. As a rule, the solvent evaporates within seconds to leave on the coated part or parts a thin film of lubricant which preferably loses its lubricating properties within 24 hours to thus ensure that the interconnected parts are not likely to become separated from each other on account of the presence of lubricant. Suitable solvents include fractions of naphtha, chlorinated hydrocarbons, alcohols and fluorochlorohydrocarbons. Suitable lubricants are liquids and solids which are compatible with elastomeric substances and penetrate with time into elastomeric materials (such as the material of the hose 1) to thereby lose their lubricating properties. The exact nature of the selected lubricant will depend upon the composition of the material of the hose 1. If the hose 1 is made of an ethylene propylene terpolymer (EPDM), the lubricant can consist of or can include a fraction of a mineral oil or a synthetic aromatic hydrocarbon.

It is equally within the purview of the invention to employ many other friction reducing agents in the form of solutions or emulsions wherein the solvent evaporates within a relatively short interval of time following the application to a hose or to a part which is to be slipped into or around the end portion of the hose. Examples of such agents are those wherein the substance which remains upon evaporation of the solvent no longer constitutes a lubricant. Thus, the agent can be a glycol which is dissolved in water and the composition of which is or can be identical with that of antifreeze for use in the radiators of motor vehicles. It is also possible to use liquid soap or sugar water (when the water evaporates, sugar acts as an adhesive and bonds the hose to the adjacent parts of the coupling).

Still further, it is possible to employ a friction reducing agent consisting of water, alcohol or any other substance which is a lubricant when applied as a thin film and evaporates after a relatively short period of time to thus reduce the likelihood of easy separation of the hose from the adjacent parts of the coupling. All that counts is to employ (if necessary) a friction reducing agent which evaporates in its entirety or in part so that the remnant does not exhibit any or loses its friction reducing properties, preferably within an interval of not more than 24 hours.

If the friction reducing agent is applied by dipping parts of the coupling into a body of such agent, it is desirable to confine the body in a vessel such that the exposed surface of the confined body is small. This reduces the likelihood of rapid evaporation of the solvent or of the entire agent.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for establishing a separable fluidtight connection between an end portion of a first tubular component wherein the end portion has an external retainer and an end portion of a second tubular component, particularly between a nipple of a first component in the form of a pipe and an end portion of a flexible elastic hose, comprising a sleeve-like tubular first section insertable into the end portion of the second component and a second section including at least one substantially prong-like flexible coupling element engageable with the external retainer of the end portion of the first component, said first section having an internal surface and an annular corrugation defining a groove extending from said internal surface radially outwardly of said first section; an annular sealing element received in said groove and engaging the exterior of the end portion of the first component upon insertion of the end portion of the first component into said first section; and a clamping member having means for biasing the end portion of the second component against the exterior of said first section.

2. The coupling of claim 1, wherein said at least one coupling element is substantially parallel to the axis of said tubular member.

3. The coupling of claim 1, wherein said clamping member includes a circumferentially complete tubular portion arranged to closely surround the end portion of the second component.

4. The coupling of claim 1, wherein said clamping member comprises two radially inwardly extending annular corrugations flanking the corrugation of said tubular section, the corrugation of said tubular section being arranged to urge the material of the end portion of the second component into said clamping member between said radially inwardly extending corrugations when the end portion of the second component is received between said tubular section and said clamping member.

5. The coupling of claim 4, wherein said clamping member is made of a ductile material and said radially inwardly extending corrugations are made as a result of deformation of the clamping member around the end portion of the second component.

6. The coupling of claim 5, wherein said radially inwardly extending corrugations are formed as a result of radially inwards deformation of the clamping member.

7. The coupling of claim 1, wherein said sections constitute separately produced parts of said tubular coupling member.

8. The coupling of claim 7, wherein said tubular coupling member comprises means for connecting said sections to each other.

9. The coupling of claim 8, wherein said connecting means includes a corrugation.

10. The coupling of claim 9, wherein said connecting means further comprises a second corrugation provided on said second section, one of said corrugations extending into the other of said corrugations.

11. The coupling of claim 7, wherein said clamping member is connected with one of said sections.

12. The coupling of claim 11, wherein said clamping member is integral with said first section.

* * * * *